Jan. 25, 1966  YOSHIKAZU KUZE  3,231,194
WAX TYPE THERMOSTAT

Filed March 20, 1964  2 Sheets-Sheet 1

INVENTOR
Yoshikazu Kuze
BY Stevens, Davis, Miller, & Mosher
ATTORNEYS

Jan. 25, 1966  YOSHIKAZU KUZE  3,231,194
WAX TYPE THERMOSTAT

Filed March 20, 1964  2 Sheets-Sheet 2

INVENTOR
Yoshikazu Kuze
BY Stevens, Davis, Miller & Mosher
ATTORNEYS

United States Patent Office 3,231,194
Patented Jan. 25, 1966

3,231,194
WAX TYPE THERMOSTAT
Yoshikazu Kuze, 64 Chidori-cho, Chofu, Ota-ku,
Tokyo, Japan
Filed Mar. 20, 1964, Ser. No. 353,482
Claims priority, application Japan, Apr. 6, 1963,
38/18,400
5 Claims. (Cl. 236—34.5)

The present invention relates to a thermostat particularly suitable for the cooling systems in an internal combustion engine.

An object of the invention is to provide a thermostat in which wax is filled in and distributed along the inner surface of a heat sensitive chamber. A rubber piston protected by a sleeve having a small coefficient of friction is acted upon by the expansion of wax when the wax becomes molten in a manner such that the frictional resistance is made extremely small to improve the sensitivity for the water temperature.

Another object of the invention is to provide a wax type thermostat adapted to obviate excessive change in shape and load to be subjected to a rubber piston for converting the increment of the volume of the molten wax into the lift of a valve, thereby increasing the durability of the thermostat.

For a better understanding of the invention, reference is taken to the accompanying drawings, in which, FIG. 1 is a longitudinal sectional view of a wax type thermostat according to the present invention;

Figure 1:
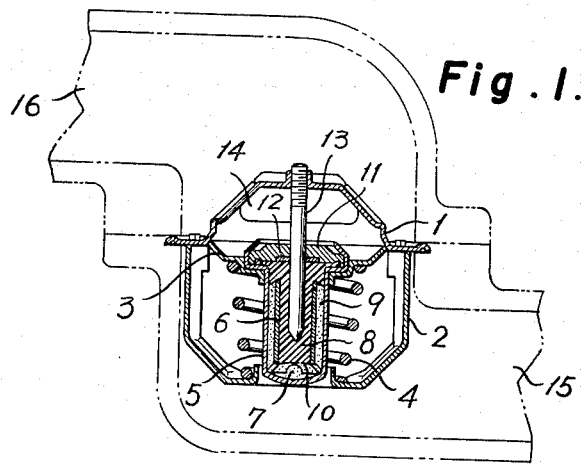
Figure 2:
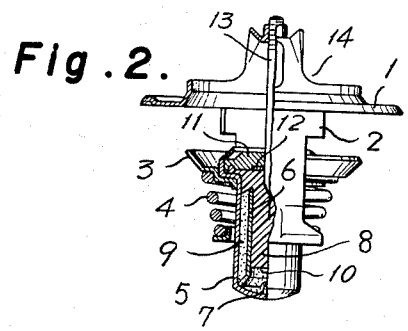
FIG. 2 shows the invention in its side elevation partially in section and with the valve open.

Referring to the drawings, flange 1 is shown secured to housing 2. A valve 3 is connected to a compression spring 4 which surrounds a heat-sensitive chamber 5. Within the heat-sensitive chamber 5 is a sleeve 6 surrounding a rubber piston 8 and which itself is surrounded by wax 9. An opening 7 provides an access for the expanded wax to push against the end of rubber piston 8. A push-rod 13 is secured to flange 1 at one end. The other end thereof is slidably inserted in rubber piston 8 through cover 11 and seal 12. Openings are typically illustrated by 14 in FIG. 1. The whole assembly is placed within a passageway for water interflowing between the engine side 15 and the radiator side 16.

If in the wax type thermostat according to the present invention constructed as explained above, it is assumed that the temperature at which the valve of the thermostat begins to open be 80° C., the temperature at which the valve will be fully opened is 90° C., and the lift of the valve when fully opened will be 8 mm. The wax 9 filled in the heat sensitive chamber 5 starts to expand after the engine is started and the water temperature in the water manifold reaches 80° C. The increment of expansion of the wax thus causes the rubber piston 8 to become compressed toward the push-rod 13. The upward force against push-rod 13 results in a downward relative opening movement of the valve 3 against the spring action of the spring 4 since the push-rod is fixedly mounted to flange 1. The cooling water in the water manifold flows through opening 14 and the water conduit 16 into the radiator. The higher the water temperature rises, the greater the expansion pressure of the wax inside the temperature sensitive chamber 5 against rubber piston 8 resulting in a greater degree of movement of push-rod 13 and opening of valve 3.

If it is assumed that the diameter of the push rod 13 be $d$, the diameter of the rubber piston 8 be $D$, the lift of the valve 3 be $h$, and the displacement of the rubber piston 8 be $H$, the following equation consists $$H = h \times \frac{d^2}{D^2}$$

Now, if $d=3$ mm., $D=7$ mm. and $h=8$ mm., then $$H = 8 \times \frac{9}{49} \fallingdotseq 1.5 \ mm.$$

Figure 4:
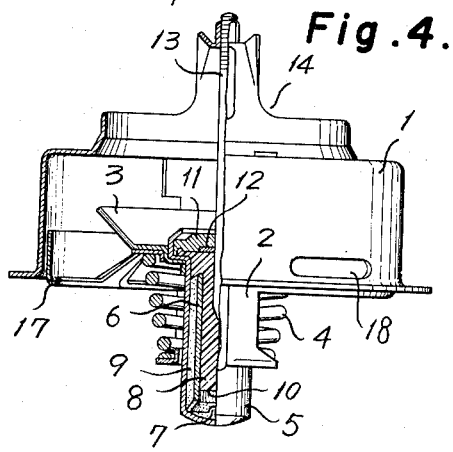
FIG. 4 shows the invention in its side elevation partially in section and shown open.
Figure 3:
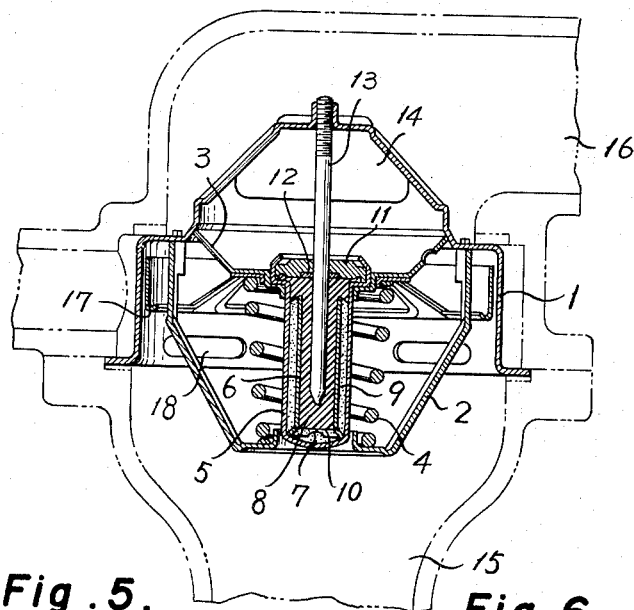
FIG. 3 is a longitudinal sectional view of a modified embodiment of the present invention.
Figure 5:
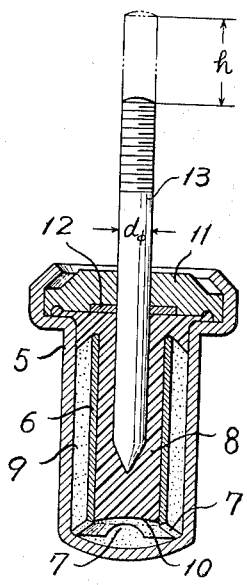
FIGS. 5 and 6 are sectional views illustrating the operation of the thermostat shown in FIGS. 1 to 4.
Figure 6:
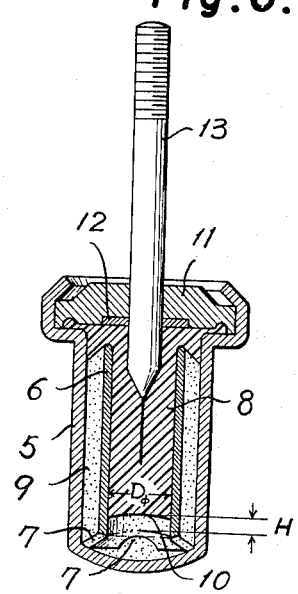

That is, it is only necessary to displace the rubber piston 8 upwards for 1.5 mm. in order to obtain 8 mm. lift of the valve 3. The rubber piston 8 not only is caused to be displaced along the flat and smooth inner surface of the sleeve 6 having a small frictional coefficient, but also is not subjected to the direct lateral pressure from the wax 9 since the sleeve 6 prevents the wax 9 from penetrating into the rubber piston 8. The upward pressure of the wax 9 is concentrated into the movable end surface 10 of the rubber piston 8 in the sleeve 6 and acts to push upwards the rubber piston 8, so that the valve 3 is relatively opened downwards against the resisting force of the spring 4. FIGS. 3 and 4 show a wax type thermostat provided with a bypass valve. In FIGS. 3 and 4, 17 designates a bypass valve made integral with the valve 3. 18 is a bypass window formed in the flange 1.

As above described, the wax type thermostat according to the invention comprises a rubber piston 8 slidably inserted in the sleeve 6 having small coefficient of friction. The wax distributed along all of the inside surface of an elongated heat sensitive chamber 5 ensures good conduction of heat and further provides the important advantage that the movable end surface of the rubber piston 8 in the sleeve 6 is acted upon by all of the expansion pressure of the molten wax, thus reducing the frictional loss to a minimum. Thus, the present invention provides a wax type thermostat having an excellent heat sensitivity which is 30% higher than that of the conventional wax type thermostat without having such sleeve. The wax type thermostat according to the present invention has the important industrial advantage that the rubber piston operates smoothly without being subjected to excessive change in shape and has a long durability, so that it is particularly adapted for use in automobiles.

Though the invention is described by means of an embodiment as shown in the drawings, yet various modifications can of course be made without departing from the scope of the claims.

What I claim is:

1. A thermostat comprising, an outer heat-sensitive chamber, an open-ended sleeve means spaced within the walls of said chamber, a rubber-like piston slidably inserted in said sleeve means and having a low coefficient of friction with respect to said sleeve means, wax-like substance sealed within said space between said chamber and said sleeve means, and beneath the open end of said sleeve means, to communicate with the lower end of said piston, and a push-rod inserted in said rubber-like piston, whereby upon being heated, said wax-like substance becomes more liquid and expands to exert a compressive force on the lower end of said rubber-like piston to thus squeeze out said push-rod.

2. A thermostat as claimed in claim 1, in which the rubber-like piston extends out of one end of said sleeve means and towards the walls of said chamber to seal the wax-like substance into said space.

3. A thermostat as claimed in claim 1, in which the push-rod is held immobile and the heat-sensitive chamber an dassembly within said chamber is moved along said push-rod to open a valve in the water-manifold of an internal combustion engine.

4. A thermostat as claimed in claim 3, having a bypass valve for the flow cooling water in a housing surrounding said heat-sensitive chamber.

5. A thermostat as claimed in claim 1, wherein the substance comprising said rubber-like piston and said wax-like substance is respectively rubber and wax.

References Cited by the Examiner

FOREIGN PATENTS 663,907 12/1951 Great Britain.
951,717 3/1964 Great Britain.

LOUIS R. PRINCE, *Primary Examiner.*

JAMES RENJILIAN, *Assistant Examiner.*